United States Patent [19]

Vasconcellos et al.

[11] Patent Number: 4,906,386

[45] Date of Patent: Mar. 6, 1990

[54] FLOCCULATION OF COAL FINES WITH POLYELECTROLYTES AND ELECTROLYTE

[75] Inventors: Stephen R. Vasconcellos, Langhorne; Phuong-Thao Luong, Trevose, both of Pa.

[73] Assignee: Betz Laboraties, Inc., Trevose, Pa.

[21] Appl. No.: 266,781

[22] Filed: Nov. 3, 1988

[51] Int. Cl.$^4$ .............................................. C02F 1/56
[52] U.S. Cl. ......................................... 210/727; 209/5; 210/734; 210/735
[58] Field of Search .................... 209/5; 210/725, 727, 210/728, 733–736

[56] References Cited

U.S. PATENT DOCUMENTS

| | | | |
|---|---|---|---|
| 3,055,827 | 9/1962 | Wiley | 210/727 |
| 3,259,570 | 7/1966 | Priesing | 210/727 |
| 3,377,274 | 4/1968 | Burke et al. | 210/727 |
| 3,408,293 | 10/1968 | Dijani et al. | 210/727 |
| 3,617,568 | 11/1971 | Ries | 210/727 |
| 3,701,417 | 10/1972 | Mercade | 209/5 |
| 3,717,574 | 2/1973 | Werneke | 210/725 |
| 3,755,159 | 8/1973 | Nagy | 210/736 |
| 4,218,316 | 4/1980 | Watson et al. | 210/727 |
| 4,456,534 | 6/1984 | Lambert et al. | 210/727 |
| 4,693,830 | 9/1987 | Thornton et al. | 210/734 |
| 4,711,727 | 12/1987 | Matthews et al. | 210/727 |
| 4,769,155 | 9/1988 | Dwyer | 210/735 |
| 4,781,839 | 11/1988 | Kelly et al. | 210/725 |
| 4,783,265 | 11/1988 | Timmons | 210/666 |

FOREIGN PATENT DOCUMENTS

| | | | |
|---|---|---|---|
| 51-87348 | 7/1976 | Japan | 210/727 |
| 53-99656 | 8/1978 | Japan | 210/728 |
| 2148938 | 6/1985 | United Kingdom | 210/728 |

*Primary Examiner*—Peter Hruskoci
*Attorney, Agent, or Firm*—Davis Hoxie Faithfull & Hapgood

[57] ABSTRACT

Coal fines are flocculated from an aqueous suspension by adding an anionic polyelectrolyte, a soluble calcium salt, and a cationic polyelectrolyte to the suspension. The anionic polyelectrolyte is preferably a high charge density, high molecular weight acrylic acid/acrylamide copolymer or a high charge density high molecular weight terpolymer of acrylic acid/methacrylic acid/ethylacrylate. The cationic polyelectrolyte is preferably a high molecular weight, low charge density dimethylamino methylmethacrylate methyl chloride quaternary ammonium salt/acrylamide copolymer, an N,N dimethyl 2 hydroxy propyl imine homopolymer or low molecular weight, a diallyl dimethyl ammonium chloride polymer, or ter polyepichlorohydrin dimethyl amine.

23 Claims, No Drawings

4,906,386

FLOCCULATION OF COAL FINES WITH POLYELECTROLYTES AND ELECTROLYTE

FIELD OF THE INVENTION

This invention relates to a method of flocculating coal fines which are suspended in water.

Some power stations, such as the Southern California Edison Mojave Station, receive coal in slurry form to generate electricity. The coal is shipped to the plant via a pipeline, dewatered by centrifugation, and the solid coal recovered is then used for power generation. Appreciable amounts of fine coal, typically 7–10% of the coal originally in the slurry, remain in the centrate. Ideally this coal should be recycled for power generation.

Recovery of coal from the centrate can be accomplished by flocculation. The flocculated coal can then be furnished to power station burners, and the cleaned supernatant water used for power station cooling and boiler applications.

The invention provides an improved method of flocculation of coal fines.

DESCRIPTION OF THE PRIOR ART

The use of polyelectrolytes to flocculate coal has been described in the literature. U.S. Pat. No. 3,717,574 discloses the use of two anionic polymers in combination with sulfuric acid to flocculate coal fines. This method has the disadvantage that the sulfuric acid may cause sulfate fouling problems downstream.

U.S. Pat. No. 3,408,293 discloses the sequential addition of an anionic polymer and a cationic polymer to flocculate coal fines and clay. However, this method has been found to be efficient only if the total amount of suspended solids is no greater than 6%. The final water clarity is extremely poor when the amount of suspended solids exceeds that percentage.

Coal fines have also been flocculated using an anionic polyelectrolyte, a cationic polyelectrolyte, and alum. Alum however, produces fluffy, high bulk sludge, causing disposal problems. Also, flocculation with alum is only effective within a limited pH range of about 5 to 8.

SUMMARY OF THE INVENTION

In accordance with the present invention coal fines are flocculated from an aqueous suspension by adding an anionic polyelectrolyte, a soluble calcium salt, and a cationic polyelectrolyte to the suspension. The anionic polyelectrolyte is preferably a high charge density, high molecular weight acrylic acid/acrylamide copolymer or a high charge density high molecular weight terpolymer of acrylic acid/methacrylic acid/ethylacrylate. The cationic polyelectrolyte is preferably a high molecular weight, low charge density dimethylamino methylmethacrylate methyl chloride quaternary ammonium salt/acrylamide copolymer, an N,N dimethyl 2 hydroxy propyl imine homopolymer of low molecular weight, a diallyl dimethyl ammonium chloride polymer, or ter polyepichlorohydrin dimethyl amine.

The calcium salt preferably has a solubility in water at 20° C. of at least 50 g/100 ml. Preferably the calcium salt is $CaCl_2$.

The order of addition of the anionic copolymer, the soluble calcium salt, and the cationic copolymer will depend on the type of coal fines being flocculated. They are added in amounts effective to flocculate the coal fines.

This process provides a high degree of compaction of the fines, at a high settling rate, while producing a clear supernatant. The process also avoids the problem of fouling downstream due to the use of sulfuric acid. Furthermore, the use of a soluble calcium salt in the process avoids the problems of fluffy high bulk sludge and limited pH range which are associated with the use of alum. The method of the invention will flocculate coal fines over a pH range of about 3–9. It is believed that the invention functions by depressing the electrostatic repulsion barrier between the coal fines through the addition of the soluble calcium salt, thereby facilitating flocculation by the polymers.

DESCRIPTION OF THE PREFERRED EMBODIMENTS

The anionic polyelectrolyte employed according to the invention has a charge density of between about 30 and 70% and a molecular weight of about 500,00 to about 50,000,000 daltons. Suitable examples are acrylic acid/acrylamide copolymers or terpolymers of acrylic acid/methacrylic acid/ethylacrylate.

Preferred acrylic acid/acrylamide copolymers generally have between about 10 to 50% acrylic acid units (mole basis) and preferably about 35%. A commercially available example is Betz 1138, which has 43% acrylic acid units and 57% acrylamide units with a molecular weight greater than 5,000,000. Other examples are M-530 from Dow Chemical Co. and BZA-40L from Floerger S.N.F. which have about 35% acrylic acid residues and 65% acrylamide residues and a molecular weight of about 2,000,000.

The terpolymers of acrylic acid/methacrylic acid/ethylacrylate preferably consist of about 33% acrylic acid, 33% methacrylic acid, and 33% ethylacrylate units. A commercially available example of such a terpolymer, having a molecular weight of about 10,000,000, is Rohm and Haas Primafloc A-10.

Suitable cationic polyelectrolytes used in the invention include a dimethylamino methylmethacrylate methyl chloride quaternary ammonium salt/acrylamide copolymer, an N,N, dimethyl 2 hydroxy propyl imine homopolymer, a diallyl dimethyl ammonium chloride polymer, or a ter polyepichlorohydrin dimethyl amine polymer.

A preferred dimethylamino methylmethacrylate methyl chloride quaternary ammonium salt/acrylamide copolymer is one having a molecular weight between about 500,000 to 10,000,000 daltons and a charge density lower than about 12%, and comprised of between about 85 and 95 molar % acrylamide. Most preferably the copolymer is comprised of about 90 molar % acrylamide. A commercially available copolymer of this type is CX-869 from Sanyo.

The N,N, dimethyl 2 hydroxy propyl imine homopolymer preferably has a molecular weight of between about 10,000 and 50,000, and a high charge density. A commercially available example of such a homopolymer is Betz 1190.

The diallyl dimethyl ammonium chloride polymer preferably has a molecular weight of between about 200,000 and 500,000 daltons. Commercial examples of this polymer are M-813, CM-100 and M-40176 from Dow Chemical Co.

A suitable ter polyepichlorohydrin dimethyl amine polymer is one having a molecular weight between about 10,000 and about 50,000 daltons.

The order of addition of the anionic polyelectrolyte, and the cationic polyelectrolyte to the coal fine suspension will vary depending on the type of coal being flocculated, and the particle size of that coal.

For coals having relatively high surface charge and high degree of hydrophilicity, such as sub-bituminous or lignite coals, the preferred order of addition is: anionic polyelectrolyte, calcium salt, cationic polyelectrolyte. The calcium salt can also be added simultaneously with the anionic polyelectrolyte. For all coals of fine particle size, for example sub-bituminous coal having particles 95% less than 100 mesh, the preferred order will generally be the same.

For coals of low surface charge, and a low degree of hydrophilicity, such as anthracite or bituminous coal, and other than fine particle size as defined above, the order of addition generally is: cationic polyelectrolyte, calcium salt, anionic polyelectrolyte. The calcium salt can also be added simultaneously with the cationic polyelectrolyte.

Simple testing using known flocculation tests will enable the optimum order of addition to be determined for any particular application.

The amount of polyelectrolyte and calcium salt used will depend on the nature of the coal and, of course, on the particular additives. In general, the anionic polyelectrolyte will be used in proportions of from 2 to 100 parts by weight per million parts of the coal suspension. The calcium salt will be generally added in quantities of from 4 to 600 parts per million. The cationic polyelectrolyte will generally be added in quantities of from 4 to 100 parts per million.

In one preferred embodiment an acrylic acid/acrylamide copolymer is first added to a suspension of coal fines having high hydrophilicity and surface charge in a dosage of between about 25 and 100 parts per million, preferably about 50 parts per million. $CaCl_2$ is added to the suspension in a dosage of between about 200 and 600 parts per million, preferably about 400 parts per million. Then an N,N, dimethyl 2 hydroxy propyl imine homopolymer is added in a dosage of between about 50 and 100 parts per million, preferably about 75 parts per million.

In another preferred embodiment of the invention, a terpolymer of acrylic acid/methacrylic acid/ethylacrylate is added to a suspension of coal fines having high hydrophilicity and surface charge in a dosage of between about 50 and 100 parts per million, preferably about 75 parts per million. $CaCl_2$ is added in a dosage of between about 200 and 600 parts per million, preferably about 400 ppm. Then a copolymer of dimethylamino methylmethacrylate methyl chloride quaternary ammonium salt/acrylamide is added in a dosage of between about 50 and 100 parts per million, preferably about 75 parts per million.

In another preferred embodiment of the invention, a diallyl dimethyl ammonium chloride polymer is first added to a suspension of coal fines of low hydrophilicity and low surface charge in a dosage of between about 4 and 40 parts per million, preferably about 20 parts per million. $CaCl_2$ is added in a dosage of between about 4 and 400 parts per million, preferably about 200 parts per million. Acrylic acid/acrylamide copolymer is then added in a dosage of between about 2 and 30 parts per million, preferably about 10 parts per million.

The invention will be further described with reference to the following specific examples which are provided as illustrations and are not to be taken as limiting the invention beyond the scope of the appended claims.

DESCRIPTION OF COAL SLURRY AND ASSAY TECHNIQUES EMPLOYED IN EXAMPLES 1-4

The coal slurry used in examples 1-4 contained western type coal having high hydrophilicity and surface charge. The slurry exhibited a pH of 7.89. It consisted of 6.03% solids, the solids having a particle size of 100% smaller than 150 mesh, and 90% smaller than 200 mesh.

Flocculation was tested as follows:

The coal slurry was stirred to ensure proper mixing of the coal fines. 500 ml aliquots of the slurry were heated to 150° F. in bottles using a water bath. Each bottle was shaken upon removal from the water bath, then 250 ml from each bottle quickly poured into a glass-stoppered graduated cylinder. A premeasured amount of the anionic polymer was added to the graduated cylinder, then the cylinder was stoppered and inverted five times.

The salt to be tested was added to the graduated cylinder, the cylinder was restoppered, and again inverted five times.

A premeasured amount of the cationic polymer to be tested was added to the graduated cylinder, the cylinder restoppered, and inverted five times.

Percent compaction was measured after six hours. At that time 25 ml of the supernatant was removed and turbidity or supernatant clarity measured using a turbidimeter.

Percent compaction is defined as (1 - (height of the settled bed/total height of the settled bed and the supernatant)) $\times 100$.

A percent compaction of greater than 35% and turbidity of less than 25 ntu (normal turbidity units) was considered successful.

EXAMPLE 1

The following two tests demonstrated successful flocculation of western type coal using the method of the invention.

(a) Anionic copolymer Betz 1138 was added to a western type coal slurry solution, in a dosage of 50 ppm. Sufficient 0.5M $CaCl_2$ was then added to the solution to give a dosage of 400 ppm. Then the cationic homopolymer Betz 1190 was added in a dosage of 75 ppm. Turbidity was found to be 10.0 ntu with 60% compaction.

(b) Anionic polymer Primafloc A-10 was added to a western type coal fine suspension in a dosage of 75 ppm. $CaCl_2$ was then added in a dosage of 400 ppm. Then cationic polymer Sanyo CX-869 was added in a dosage of 75 ppm. Turbidity was measured at 10.8 ntu after 24 hours, and the percent compaction after 6 hours was found to be 47%.

EXAMPLE 2

These tests showed the addition to a coal suspension of $CaCl_2$ alone, polymers alone, or one polymer and $CaCl_2$ was ineffective in flocculating coal fines.

(a) $CaCl_2$, in a dosage of 400 ppm was added to the coal fine suspension described above without the addition of any anionic polymer or cationic polymer. Turbidity was measured at more than 200 ntu with 0% compaction, demonstrating poor flocculation.

(b) 100 ppm of the anionic copolymer Betz 1138 was added to the coal fine suspension described above, and then 100 ppm of the cationic polymer Betz 1190 added, without the addition of any salt. Poor flocculation resulted, as shown by turbidity greater than 200 ntu and 0% compaction.

(c) 100 ppm of the anionic terpolymer Primafloc A-10 was added the coal fine suspension described above, and then 100 ppm of Betz 190, without the addition of any salt. Poor flocculation resulted, with resulting turbidity greater than 200 ntu and 0% compaction.

(d) 100 ppm of anionic polymer Primafloc A-10 was added to the coal fine suspension described above, then 400 ppm of $CaCl_2$ was added without the addition of any cationic polymer. The resulting turbidity was greater than 200 ntu and 0% compaction was found, showing poor flocculation.

EXAMPLE 3

These two tests showed that substituting $MgCl_2$ for $CaCl_2$, was ineffective with the polymers of the invention in flocculating coal.

In the first test 100 ppm of Primafloc A-10, was added to a western type coal fine suspension as described above followed by 400 ppm $MgCl_2$, and then 100 ppm Sanyo CX-869.

In the second test 50 ppm of Betz 1138 was added to the western type coal suspension followed by 400 ppm $MgCl_2$, then 100 ppm Betz 1190.

These treatments were ineffective, as shown by turbidities of 100 ntu or greater, and compaction of 20% or less.

EXAMPLE 4

This test showed the ineffectiveness of substituting polyacrylic acid for the anionic polymers of the invention. 100% polyacrylic acid, molecular weight about 500,000, was added to the coal fine suspension described above in a dosage of 100 ppm, followed by 400 ppm of $CaCl_2$, and then 75 ppm of cationic polymer Sanyo CX-869. The resulting flocculation was poor. Turbidity was greater than 200 ntu, and compaction was 15%.

DESCRIPTION OF COAL SLURRY AND ASSAY TECHNIQUES EMPLOYED IN EXAMPLES 5-7

The coal employed in examples 5-7 was an eastern type coal of relatively low surface charge and hydrophilicity.

Flocculation was tested as follows:

The coal slurry was stirred to ensure proper mixing of the coal fines. 250 ml aliquots of the slurry were used for evaluation, taken from a constantly stirred reservoir. Each aliquot was quickly poured into a glass-stoppered graduated cylinder. A premeasured amount of the cationic polymer was added to the graduated cylinder, then the cylinder was stoppered and inverted twice.

The salt to be tested was added to the graduated cylinder, the cylinder was restoppered, and inverted twice.

A premeasured amount of the anionic polymer to be tested was added to the graduated cylinder, the cylinder restoppered, and inverted five times.

The settling rate for each sample was obtained by recording the time for the flocculant interface in the graduated cylinder to traverse from 210 ml to 150 ml.

The amount of compaction was measured for each sample by recording the final bed height after three minutes. Turbidity was measured after five minutes for each sample in a HACH DR −3 spectrophotometer.

Treatments having turbidities greater than 40% transmittance, settling rates less than 2 ml/sec, and final bed compactions in the 250 ml graduated cylinder of less than 3.5" were considered to be effective in flocculating the coal fines from the suspension.

EXAMPLE 5

The following two tests demonstrated that eastern type coal was successfully flocculated using the method of the invention. The cationic polymer was added first, followed by $CaCl_2$, then anionic polymer.

In the first test 4 ppm of CM-100 was followed by 4 ppm $CaCl_2$, and 12 ppm M-530. Settling rate of 4.68 mm/sec, compaction of 3.15", and transmittance of 72% were measured.

In the second test 4 ppm of CM-100 was followed by 4 pmm of $CaCl_2$, and then 12 ppm BZA40L. Settling rate of 4.68 mm/sec, compaction of 3.10", and transmittance of 64% were measured.

EXAMPLE 6

In the following test $CaCl_2$ was more effective than alum in flocculating coal fines. 10 ppm of the cationic polymer M-40176 was added to the coal fine suspension as described above, followed by 80 ppm alum, and then 20 ppm of the anionic polymer M-530. The coal flocs settled at a rate of 1.1 ml/sec, compacting to 4.75", and the turbidity of the supernatant was measured at 40% transmittance.

The same concentrations of M-40176 and M-530 were added to a coal fine suspension as were added in the above paragraph, but 80 ppm $CaCl_2$ was added instead of alum. The coal fines were flocculated more effectively than with the alum above, as shown by a settling rate of 2.58 ml/sec, a bed compaction of 3.5", and 65% transmittance.

EXAMPLE 7

The following tests showed that eastern type coal fines were not flocculated by the polymers of the invention in the absence of $CaCl_2$.

(a) 6 ppm of CM-100 was added to the eastern type coal fine suspension as described above, followed by 12 ppm of M-530. 4.94 mm/sec settling rate, 2.70" compaction, and 3% transmittance were measured showing poor flocculation.

(b) 12 ppm CM-100 was added as above, followed by 12 ppm M-530. 3.44 mm/sec settling rate, 2.90" compaction, and 6% transmittance were measured showing poor flocculation.

What is claimed is:

1. A process for the flocculation of coal fines in water which comprises
   (a) adding a cationic polyelectrolyte to a suspension of coal fines in water;
   (b) adding at least about 4ppm $CaCl_2$ to the suspension;
   (c) adding an anionic polyelectrolyte to the suspension; and
   (d) separating the flocculated coal fines from the aqueous suspension; the anionic polyelectrolyte being selected from the group consisting of an acrylic acid/acrylamide copolymer and a terpolymer of acrylic acid, methacrylic acid, and ethylacrylate; the cationic polyelectrolyte being selected from the group consisting of a dimethylamino methylmethacrylate methyl chloride quaternary ammonium salt/acrylamide copolymer, and N, N dimethyl 2 hydroxy propyl imine homopolymer, a diallyl dimethyl ammonium chloride polymer, a ter polyepichlorohydrin dimethyl amine polymer; the $CaCl_2$, cationic polyelectrolyte, and anionic polyelectrolyte being added in amounts and in a sequence effective to flocculate the coal fines, wherein said cationic polyelectrolyte is added prior to the addition of said anionic polyelectrolyte.

2. The process of claim 1 wherein the coal fines are of coal having a surface charge about equal to or greater than that of lignite.

3. The process of claim 1 wherein the coal fines are of coal having surface charge about equal to or less than that of anthricite or bituminous coal.

4. A process for the flocculation of coal fines suspended in water which comprises
   (a) an anionic adding polyelectrolyte to a suspension of coal fines in water;
   (b) adding at least about 200 ppm $CaCl_2$ to the suspension;
   (c) adding a cationic polyelectrolyte to the suspension which second polyelectrolyte is an anionic polyelectrolyte where a cationic polyelectrolyte was added in step a, and a cationic polyelectrolyte where an anionic polyelectrolyte was added in; and
   (d) separating the flocculated coal fines from the aqueous suspension;
   the anionic polyelectrolyte being selected from the group consisting of an acrylic acid/acrylamide copolymer and a terpolymer of acrylic acid, methacrylic acid and ethylacrylate;
   the cationic polyelectrolyte being selected from the group consisting of a dimethylamino methylmethacrylate methyl chloride quaternary ammonium salt/acrylamide copolymer, an N,N, dimethyl 2 hydroxy propyl imine homopolymer, a diallyl dimethyl ammonium chloride polymer, and a ter polyepichlorohydrin dimethyl amine polymer;
   the $CaCl_2$, anionic polyelectrolyte and cationic polyelectrolyte being added in amounts and in a sequence effective to flocculate the coal fines, wherein said anionic polyelectrolyte is added prior to said cationic polyelectrolyte.

5. The process of claim 4 wherein the cationic polyelectrolyte is selected from the group consisting of dimethylamino methylmethacrylate methyl chloride quaternary ammonium salt/acrylamide copolymer, an N,N, dimethyl 2 hydroxy propyl imine homopolymer and a diallyl dimethyl ammonium chloride polymer.

6. The process of claim, 5 wherein the coal fines are of coal having a surface charge about equal to or greater than that of lignite.

7. The process of claim 5 wherein the coal fines are of coal having a surface charge about equal to or less than that of anthricite or bituminous coal.

8. The process of claim 5 wherein the acrylic acid/acrylamide copolymer comprises between about 10 and 50 molar % acrylic acid, the terpolymer comprises approximately equal proportions of acrylic acid, methacrylic acid and ethylacrylate, and the dimethylamino methylmethacrylate methyl chloride quaternary ammonium salt/acrylamide copolymer comprises between about 85 and 95 molar % acrylamide.

9. The process of claim 8 wherein the acrylic acid/acrylamide copolymer comprises about 35 molar % acrylic acid, and the dimethylamino methylmethacrylate methyl chloride quaternary ammonium salt/acrylamide copolymer comprises about 90 molar % acrylamide.

10. A process for the flocculation of coal fines suspended in water, which coal fines comprise coal having a surface charge about equal to or greater than that of lignite which comprises
   (a) adding an acrylic acid/acrylamide copolymer to the suspension of the coal fines in water;
   (b) adding at least about 200 ppm $CaCl_2$ to the suspension;
   (c) adding an N,N, dimethyl 2 hydroxy propyl imine homopolymer formula to the suspension; and
   (d) separating the flocculated coal fines from the aqueous suspension;
   wherein the acrylic acid/acrylamide copolymer, $CaCl_2$, and the N,N dimethyl 2 hydroxy propyl imine homopolymer are added in amounts and in a sequence effective to flocculate the coal fines, and wherein said copolymer is added prior to said homopolymer.

11. The process of claim 10 wherein the acrylic acid/acrylamide copolymer has a molecular weight from about 500,000 to about 50,000,000 daltons, a charge density of between about 30 and 70% and is added in a dosage of between about 25 and 100 ppm, the $CaCl_2$ is added in a dosage of between about 200 and 600 ppm, and the N,N, dimethyl 2 hydroxy propyl imine homopolymer has a molecular weight of between about 10,000 and 50,000 daltons and is added in a dosage of between about 50 and 100 ppm.

12. The process of claim 11 wherein the acrylic acid/acrylamide copolymer is added in a dosage of about 50 ppm, the $CaCl_2$ is added in a dosage of about 400 ppm, and the N,N, dimethyl 2 hydroxy propyl imine homopolymer is added in a dosage of about 75 ppm.

13. The process of claim 10 wherein the acrylic acid/acrylamide copolymer comprises between about 10 and 50 molar % acrylic acid.

14. The process of claim 10 wherein the acrylic acid/acrylamide copolymer comprises about 35 molar % acrylic acid.

15. A process for the flocculation of coal fines suspended in water, which coal fines comprise coal having a surface charge about equal to or greater than that of lignite, which comprises
   (a) adding a terpolymer of acrylic acid, methacrylic acid and ethylacrylate to the suspension of the coal fines in water;
   (b) adding at least about 200 ppm $CaCl_2$ to the suspension;
   (c) adding a dimethylamino methylmethacrylate methyl chloride quaternary ammonium salt/acrylamide copolymer to the suspension; and
   (d) separating the flocculated coal fines from the aqueous suspension;
   wherein the terpolymer, the $CaCl_2$, and the dimethylamino methylmethacrylate methyl chloride quaternary ammonium salt/acrylamide copolymer are added in amounts and in a sequence effective to flocculate the coal fines, and wherein said terpolymer is added prior to said copolymer.

16. The process of claim 15 wherein the terpolymer has a molecular weight from about 500,000 to about 10,000,000 daltons, a charge density of between about 30 and 70%, and is added in a dosage of between about 50 and 100 ppm, the $CaCl_2$ is added in a dosage of between about 200 and 600 ppm and the dimethylamino methylmethacrylate methyl chloride quaternary ammonium salt/acrylamide copolymer has a molecular weight greater than about 500,000 daltons and is added in a dosage of between about 50 and 100 ppm.

17. The process of claim 16 wherein the terpolymer is added in a dosage of about 75 ppm, the CaCl$_2$ is added in a dosage of about 400 ppm, and the dimethylamino methylmethacrylate methyl chloride quaternary ammonium salt/acrylamide copolymer is added in a dosage of about 75 ppm.

18. The process of claim 15 wherein the terpolymer comprises approximately equal proportions of acrylic acid, methacrylic acid and ethylacrylate, and the dimethylamino methylmethacrylate methyl chloride quaternary ammonium salt/acrylamide copolymer is comprised of between about 85 and 95 molar % acrylamide.

19. A process for the flocculation of coal fines suspended in water, which coal fines comprise coal having a surface charge about equal to or less than that of anthracite, which comprises
    (a) adding a diallyl dimethyl ammonium chloride polymer to the suspension of the coal fines in water;
    (b) adding at least about 4 ppm CaCl$_2$ to the suspension;
    (c) adding an acrylic acid/acrylamide copolymer to the suspension; and
    (d) separating the flocculated coal fines from the aqueous suspension;
    wherein the diallyl dimethyl ammonium chloride polymer, CaCl$_2$, and the acrylic acid/acrylamide copolymer are added in amounts and in a sequence effective to flocculate the coal fines, and wherein said polymer is added prior to said copolymer.

20. The process of claim 19 wherein the diallyl dimethyl ammonium chloride polymer has molecular weight of between about 200,000 and 500,000 daltons and is added in a dosage of between about 4 and 40 ppm, the CaCl$_2$ is added in a dosage of between about 4 and 400 ppm, and the acrylic acid/acrylamide copolymer has a molecular weight from about 500,000 to about 50,000,000 daltons, a charge density of between about 30 and 70%, and is added in a dosage of between about 2 and 30 ppm.

21. The process of claim 20 wherein the diallyl dimethyl ammonium chloride polymer is added in a dosage of about 20 ppm, the CaCl$_2$ is added in a dosage of about 200 ppm, and the acrylic acid/acrylamide copolymer is added in a dosage of about 15 ppm.

22. The process of claim 19 wherein the acrylic acid/acrylamide copolymer comprises between about 10 and 50 molar % acrylic acid.

23. The process of claim 19 wherein the acrylic acid/acrylamide copolymer comprises about 35 molar % acrylic acid.

* * * * *

UNITED STATES PATENT AND TRADEMARK OFFICE
CERTIFICATE OF CORRECTION

PATENT NO. : 4,906,386
DATED : March 6, 1990
INVENTOR(S) : Vasconcellos, et al

It is certified that error appears in the above-indentified patent and that said Letters Patent is hereby corrected as shown below:

Col. 7, line 18, should recite:
"(a) adding an anionic polyelectrolyte to a suspension"

Col. 7, lines 22 - 26, should recite:
"(c) adding a cationic polyelectrolyte to the suspension; and"

Col. 7, line 51, should recite:
"6. The process of claim 5 wherein the coal fines are"

Col. 9, line 21, should recite:
"anthracite or bituminous coal, which comprises"

Signed and Sealed this

Third Day of August, 1993

Attest:

MICHAEL K. KIRK

Attesting Officer    Acting Commissioner of Patents and Trademarks